H. M. MOFFETT.
AUTOMOBILE SIGNAL.
APPLICATION FILED JULY 10, 1917.

1,278,711.

Patented Sept. 10, 1918.
2 SHEETS—SHEET 1.

WITNESSES

INVENTOR
H. M. Moffett,
BY Victor J. Evans
ATTORNEY

H. M. MOFFETT.
AUTOMOBILE SIGNAL.
APPLICATION FILED JULY 10, 1917.

1,278,711.

Patented Sept. 10, 1918.
2 SHEETS—SHEET 2.

WITNESSES
C. F. Rudolph
E. M. Springer

INVENTOR
H. M. Moffett,
BY Victor J. Evans
ATTORNEY

UNITED STATES PATENT OFFICE.

HARLEY M. MOFFETT, OF GARRETT, INDIANA.

AUTOMOBILE-SIGNAL.

1,278,711.

Specification of Letters Patent.   Patented Sept. 10, 1918.

Application filed July 10, 1917.   Serial No. 179,741.

*To all whom it may concern:*

Be it known that I, HARLEY M. MOFFETT, a citizen of the United States, residing at Garrett, in the county of Dekalb and State of Indiana, have invented new and useful Improvements in Automobile-Signals, of which the following is a specification.

This invention relates to automobile signals and more particularly to that class of signals designed to indicate the direction in which the operator intends to proceed when leaving the direct line of travel.

An object is to provide novel means for operating the indicating device and throwing the latter into position where it will be observed by an individual driving another car which may be following the first car.

A further object is to provide a plurality of electric signaling devices or signal lamps, these lamps showing colored lights indicating danger in the direction in which the operator intends to proceed, so that the operator of the second car may take warning and avoid a possible collision.

With the above and other objects in view, the invention consists in the novel construction, combination and arrangement of elements hereinafter described and claimed:—

Figure 1:
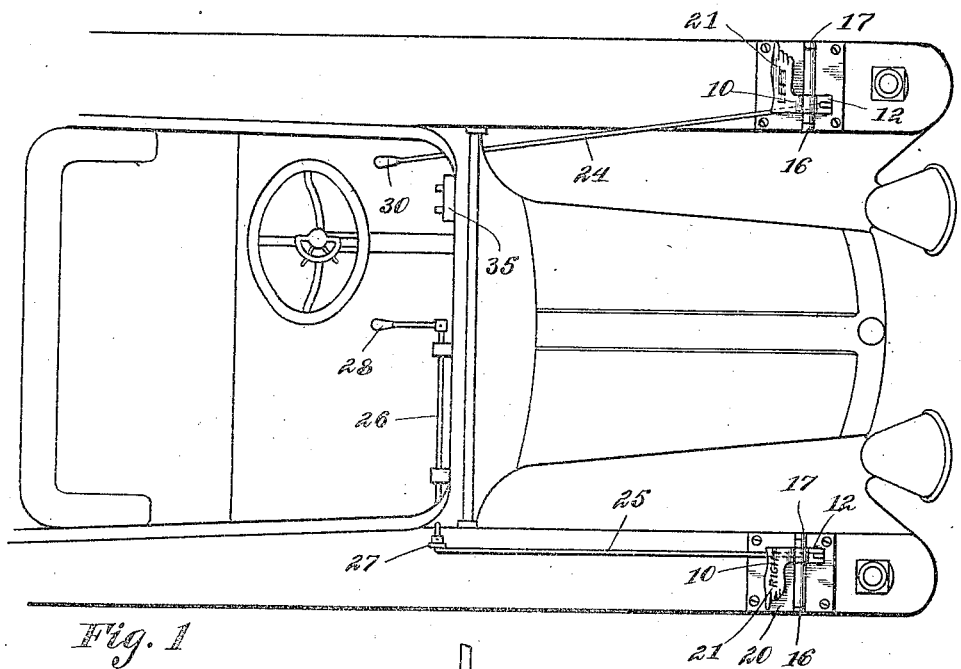
Figure 1 is a top plan view showing the position of the signals on the machine.
Figure 2:
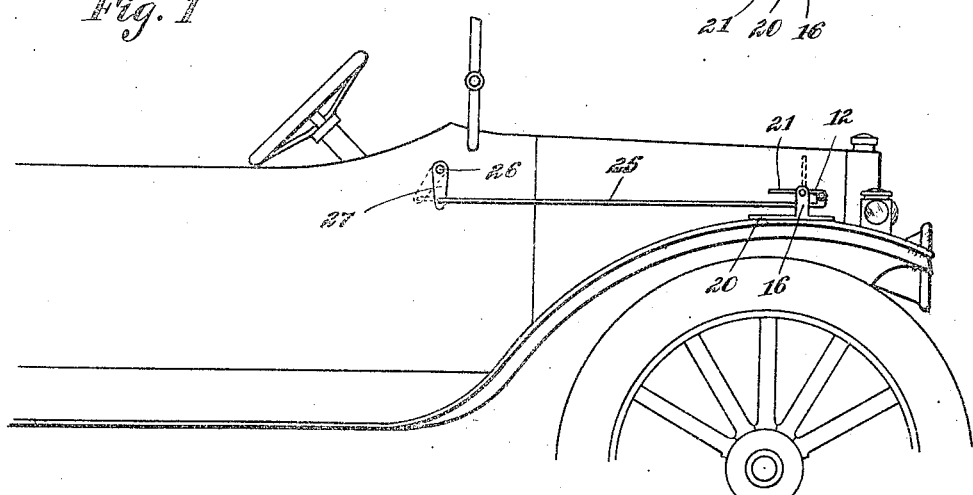
Fig. 2 is a view in side elevation.
Figure 3:
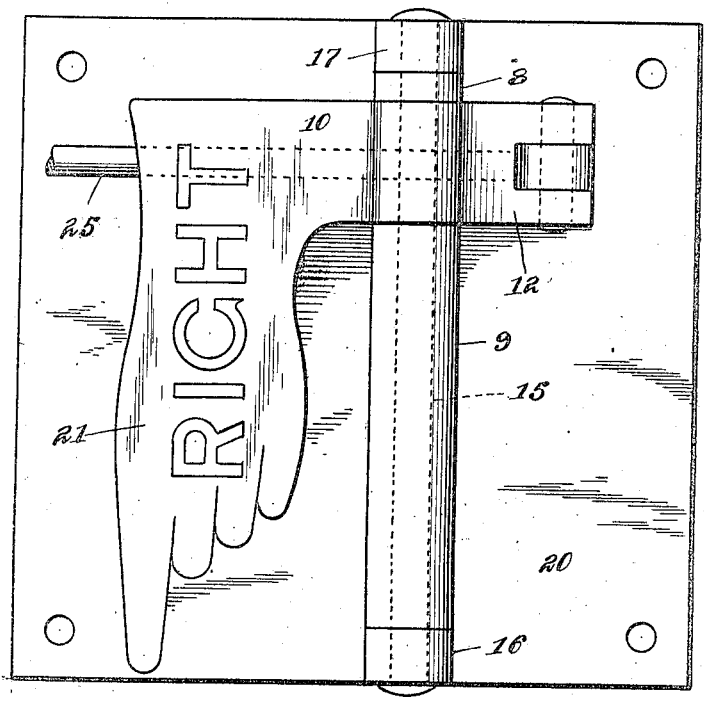
Fig. 3 is a top plan view of one of the signals removed from the machine.
Figure 4:
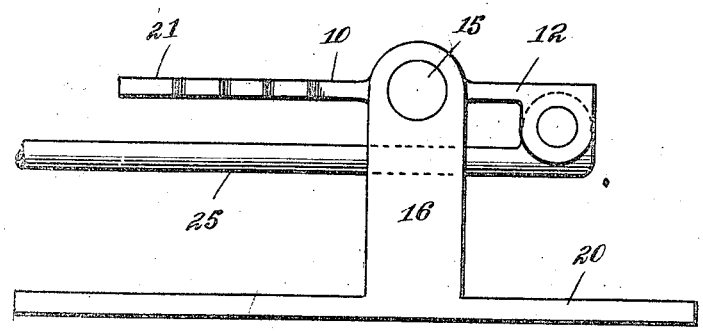
Fig. 4 is a side elevation of the structure of Fig. 3.

In carrying out my invention, I mount on opposite sides of the car preferably above the front fenders thereof a plurality of mechanically operating signaling devices, these devices being carried on a base portion which base may also carry an electric signaling device consisting of an electric lamp under the control of the operator of the car, said lamp having a casing provided with red glass for the purpose of showing a red light toward the front when it is desired to indicate danger—that is when it is desired to indicate that the operator intends to turn his car and proceed toward the right or left as the case may be. The lamp on the right side of the car will show a red light on that side when the proper push button is pressed, and the lamp on the opposite side of the car will show a similar light, each lamp being provided with colored glass for the purpose of directing the rays in a forward direction and also directing said rays outwardly from the body of the car on either side thereof.

The signaling device is operated through the use of the colored lights at night, and during the day the mechanical portion of the apparatus is brought into use. A rear light is also provided, the casing having green glass therein for the purpose of indicating caution.

The mechanically operated signal includes a pivoted arm with means thereon for indicating the direction the operator intends to proceed, and this arm may comprise a plate 10 having a downwardly extending portion 12 and having a tubular portion 14 therein through which a horizontally mounted bar 15 extends. This bar may be mounted in upstanding members 16 and 17 carried by the base portion 20, constituting a support for the mechanical and the electrical portions of the apparatus.

The structure of the mechanical signal is the same on both sides of the machine, with the exception that the hand portion 21 carried by member 10 points outwardly in each instance. On one of these devices is the word "right" and on the other the word "left," and the operator of course throws into proper position the arm which properly indicates the direction in which he intends to proceed. When in inoperative position, the hand lies horizontally, and when in operative position it is swung by means of connecting rod 24 or 25, as the case may be. On the right hand side of the machine the rod 25 is operated by means of a rotating member 26 carrying at one end thereof an arm 27 which in turn has connection with rod 25. Rotating member 26 is provided with a handle 28 at the upper end thereof and is located within convenient reach of the operator.

On the left hand side of the machine connecting bar 24 has a handle portion 30, also extending to a point within reach of the operator, said connecting rod passing through the dashboard of the car. A switch for controlling the lamp circuits is designated 35 and is located at any convenient point, as for instance between the handle member 28 and 30.

The bar 14 which carries the swinging signal arms also carries tubular members 8 and 9, on opposite sides of said swinging arms, for the purpose of properly spacing the latter and preventing endwise movement with reference to the bar.

Figure 5:
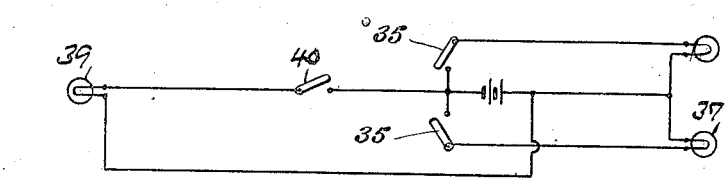
Fig. 5 is a diagrammatic view of the circuits.

It is obvious that the device 21 may be operated electrically if desired, suitable connections being made with circuits for the lamps 37 shown in Fig. 5, and switches being provided, whereby either the lamps or the mechanical signals will be in operation a given time. The rear lamp 39 is under the control of a separate switch 40.

I claim:—

In a device of the class described, a tubular member, a rod extending therethrough, means for mounting the rod, a plate member constituting an indicating device carried by the tubular member, and extending on opposite sides thereof, one portion of the plate member carrying a designation indicating the direction of travel, and the other portion of said plate member being deflected and including an apertured portion, and an operating rod having pivotal connection with the apertured portion, and extending beneath the plate member and adapted to throw the latter from a horizontal to a vertical position.

In testimony whereof I affix my signature.

HARLEY M. MOFFETT.